United States Patent [19]

Asanuma et al.

[11] Patent Number: 5,428,127
[45] Date of Patent: Jun. 27, 1995

[54] PREPARATION PROCESS OF SYNDIOTACTIC POLYPROPLENE

[75] Inventors: Tadashi Asanuma, Osaka; Tetsunosuke Shiomura, Tokyo; Nobutaka Uchikawa; Tateyo Sasaki, both of Osaka; Norihide Inoue, Kanagawa; Osamu Uchida; Tutomu Iwatani, both of Osaka, all of Japan

[73] Assignee: Mitsui Toatsu Chemicals, Incorporated, Tokyo, Japan

[21] Appl. No.: 339,298

[22] Filed: Nov. 10, 1994

Related U.S. Application Data

[63] Continuation of Ser. No. 100,190, Aug. 2, 1993, abandoned, which is a continuation of Ser. No. 613,694, Nov. 27, 1990, abandoned.

[30] Foreign Application Priority Data

| Apr. 11, 1989 | [JP] | Japan | 1-89721 |
| Apr. 11, 1989 | [JP] | Japan | 1-89722 |
| Sep. 1, 1989 | [JP] | Japan | 1-224675 |
| Feb. 13, 1990 | [JP] | Japan | 2-29473 |

[51] Int. Cl.⁶ ............................ C08F 6/28
[52] U.S. Cl. ...................... 528/497; 528/498
[58] Field of Search ................ 528/497, 498

[56] References Cited

U.S. PATENT DOCUMENTS

| 2,935,499 | 5/1960 | Albright et al. | 528/498 |
| 3,167,536 | 1/1965 | Zampachova et al. | 528/498 |
| 3,173,904 | 3/1965 | Friedlander et al. | 528/498 |
| 3,197,454 | 7/1965 | Plaster | 528/498 |
| 3,272,789 | 9/1966 | Joyner et al. | 528/498 |
| 3,395,136 | 7/1968 | Francis | 528/498 |
| 3,398,129 | 8/1968 | Leibson et al. | 528/498 |
| 3,415,799 | 12/1968 | Helm | 528/498 |
| 3,903,066 | 9/1975 | Rohde | 528/498 |
| 4,892,851 | 1/1990 | Ewen et al. | 502/103 |

FOREIGN PATENT DOCUMENTS

| 0299391 | 1/1989 | European Pat. Off. |
| WO88/05792 | 8/1988 | WIPO |
| WO88/05793 | 8/1988 | WIPO |

OTHER PUBLICATIONS

J. Am. Chem. Soc. 1988 110, pp. 6255–6256 (J. A. Ewen).

*Primary Examiner*—Joseph L. Schofer
*Assistant Examiner*—Tom Weber
*Attorney, Agent, or Firm*—Burns, Doane, Swecker & Mathis

[57] ABSTRACT

Disclosed herein is a process for preparing a syndiotactic polypropylene comprising washing with a hydrocarbon solvent a polymer obtained by polymerizing propylene in the presence of a catalyst comprising a transition metal compound having an asymmetric ligand. The slurry of the polymer obtained by the polymerization is treated with a $\beta$-dicarboxy compound and an alcohol or with an alcohol containing hydrochloric acid gas under non-aqueous conditions prior to the washing with a hydrocarbon solvent so that the residue of the catalyst used in the polymerization reaction may be rendered soluble in the hydrocarbon solvent, the properties of the resulting syndiotactic polypropylene are improved greatly.

7 Claims, No Drawings

PREPARATION PROCESS OF SYNDIOTACTIC POLYPROPLENE

This application is a continuation of application Ser. No. 08/100,190 filed Aug. 2, 1993, now abandoned, which is a continuation of application Ser. No. 07/613,694, filed Nov. 27, 1990.

TECHNICAL FIELD

This invention relates to a process for preparing a syndiotactic polypropylene. More specifically, it relates to a process for preparing a syndiotactic polypropylene excellent in properties, the surface and the like of molded articles thereof being not sticky.

BACKGROUND ART

Although the existence of syndiotactic polypropylenes has been known from old days, those produced by the conventional process, in which propylene is polymerized at a low temperature in the presence of a catalyst comprising a vanadium compound, an ether and an organoaluminum, are of low syndiotacticity and hence can hardly be regarded as characterizing syndiotactic polypropylenes. On the other hand, a polypropylene of a good tacticity, e.g., a syndiotactic pentad fraction of more than 0.7, has been discovered for the first time by J. A. Ewen et al. by the use of a catalyst comprising a transition metal compound having an asymmetric ligand and an aluminoxane (J. Am. Chem. Soc., 1988, 110, 6255–6256).

The above-mentioned method by J. A. Ewen et al. exhibits a good activity per unit amount of the transition metal and gives the resultant polypropylene a high tacticity and fairly excellent properties. However, the surface of its molded articles is so sticky that it has raised problems on practical use.

DISCLOSURE OF THE INVENTION

The present inventors have made intensive investigations into a process for preparing syndiotactic polypropylenes which are freed from the aforesaid problems and molded articles of which have no stickiness, leading to completion of the present invention. Thus, the present invention provides a process for preparing a syndiotactic polypropylene comprising washing with a hydrocarbon solvent a polymer obtained by polymerizing propylene in the presence of a catalyst comprising a transition metal compound having an asymmetric ligand.

BEST MODE FOR PUTTING THE INVENTION INTO PRACTICE

Syndiotactic polypropylenes used in the present invention may be produced according to the process disclosed in the aforesaid literature by way of example. However, the process of the present invention can be applied to the polypropylenes which are substantially syndiotactic even if the catalyst used in their formation differs from that described in the aforesaid literature.

The exemplary transition metal compound having an asymmetric ligand may include isopropyl(cyclopentadienyl-1-fluorenyl)hafnium dihalogenide or isopropyl(cyclopentadienyl-1-fluorenyl)zirconium dihalogenide, as described in the aforesaid literature. Upon polymerization, an aluminoxane is generally used in combination. As the aluminoxane may be cited compounds

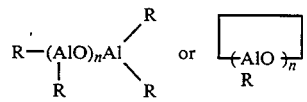

(wherein R is a hydrocarbon residue of 1–3 carbon atoms). The compounds wherein R is a methyl group, i.e. methylaluminoxane, and n is 5 or more, preferably 10 or more, are particularly used. The proportion of the aluminoxane used is 10 to 1,000,000 mole times, usually 50 to 5,000 mole times based on the foregoing transition metal compound.

In the present invention, it is also possible to use those catalyst systems each of which comprises the transition metal compound, in which at least one of the halogen atoms of the aforesaid transition metal compounds is replaced by an alkyl group, and jointly a boron compound shown, for example, in Japanese Patent Laid-Open Nos. 501950/'89 and 502036/'89.

No particular restrictions are imposed on the polymerization conditions, and hence the solvent polymerization process using inert solvents, the bulk polymerization process in the substantial absence of inert solvents and the gas phase polymerization process; may be used.

It is common practice to carry out the polymerization at a temperature of $-100°$ to $200°$ C. and a pressure of atmospheric to 100 kg/cm$^2$G. Temperatures of $-100°$ to $100°$ C. and pressures of atmospheric to 50 kg/cm$^2$G are preferred.

In the present invention, the hydrocarbon solvent includes propylene itself, saturated hydrocarbon compounds such as propane, butane, pentane, hexane, heptane, octane and nonane, aromatic hydrocarbon compounds such as benzene, toluene, xylene and ethylbenzene, and those hydrocarbons in which a part or all of the hydrogen atoms thereof are substituted with halogen such as fluorine, chlorine, bromine or iodine.

In the present invention, any washing technique can be used without particular restriction, so long as it permits dissolving the portion of the polypropylene which is soluble in the solvent and separating the soluble portion from the insoluble portion. Thus, the washing technique may mean any desired method of washing a solid with a liquid in a usual manner. In other words, such techniques may be used as adding the solvent onto the polymer layer followed by separation through filtration, dispersing the polymer in the solvent followed by separation of the solid phase from the liquid phase by decantation, centrifugation or filtration, or bringing the polymer into countercurrent contact with the solvent by the use of a countercurrent washing column. It is particularly preferable to disperse the polymer in the solvent and separate the polymer from the solvent by decantation, centrifugation or filtration.

Further, when a hydrocarbon solvent is used as a liquid polymerization solvent, it is included in the category of the washing of the present invention to separate the polymer from the solvent merely by filtration or centrifugation after the polymerization reaction. In this case, it is also feasible to wash the polymerized polymer with a polymerization solvent to be used in the subsequent reaction by bringing them into countercurrent contact with each other in a countercurrent washing column.

The washing temperature may be optionally selected from temperatures which are lower than the melting point of the polymer and at which the solvent is liquid, and it is generally in the range of 0°-100° C. Usually, the washing may be carried out at ambient temperature. In one washing operation, the amount of the solvent is preferably equal to or more than the apparent volume of the polymer. If the surface of its molded articles is sticky by one washing operation, it is necessary to repeat the washing operation.

In the present invention, it is further possible to improve the properties of the resultant syndiotactic polypropylene by making the catalyst residue soluble in a hydrocarbon solvent prior to washing with the solvent. The means to solubilize the catalyst residue is:
1. to treat the polymer with a β-dicarboxy compound and an alcohol or
2. to treat the polymer with an alcohol containing hydrochloric acid gas (equivalent to hydrogen chloride) under non-aqueous conditions prior to the washing with a hydrocarbon solvent. Each process is illustrated hereunder.

The first process comprises treating the polymer with a β-dicarboxy compound represented by the general formula

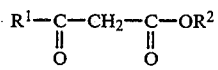

(wherein $R^1$ and $R^2$ are individually hydrocarbon residue having 1–12 carbon atoms) and an alcohol followed by washing with a hydrocarbon solvent, or treating it with the β-dicarboxy compound and an alcohol and then washing it with water under acidic conditions followed by washing with a hydrocarbon solvent. The treating signifies mixing the polymer with the treating agents for from seconds to hours by a mechanical means such as agitation. As the β-carboxy compound, may preferably be used one whose $R^1$ and $R^2$ are relatively low molecular, e.g., methyl, ethyl, propyl and butyl in particular. Its amount to be used is 0.1–100 parts by weight, commonly 1–20 parts by weight, based on one part by weight of the aluminoxane used. As the alcohol may preferably be used saturated monovalent alcohols having 1–12 carbon atoms or those alcohols, the hydrogen atom of which is substituted with a saturated alkoxyl group having 1–12 carbon atoms, or polyethylene glycol monoesters represented by the general formula $H—OCH_2CH_2)_nOR^3$ (wherein $R^3$ represents an alkyl group having 1–12 carbon atoms and n stands for an integer of 1–10). When the polymerization reaction is effected according to the solvent polymerization or bulk polymerization process, the treatment with the β-dicarboxy compound and alcohol is carried out by the addition of the alcohol and β-dicarboxy compound to the slurry with or without purging the unreacted propylene after completion of the reaction, or when the reaction is effected by gas phase polymerization, the treatment is carried out by dispersing the polymer in an inert medium or liquid propylene to form a slurry after completion of the reaction and adding thereto the alcohol and β-dicarboxy compound. The amount of the alcohol used is 0.001–10 parts by weight, generally 0.05–1 part by weight, based on one part by weight of the slurry. The treatment is generally carried out at the temperature of the polymerization reaction or under heating, usually at a temperature of −100°–200° C. Since the aluminoxane is made soluble in the hydrocarbon solvent by this treatment, the catalyst residue can be removed sufficiently by the successive washing of the slurry with the hydrocarbon solvent as described above. The treatment is carried out under non-aqueous conditions. The non-aqueous conditions signify conducting the above treatment in the substantial absence of water. Hence, the alcohol and β-dicarboxy a compound to be added for the above treatment and the inert solvent or liquid propylene to be added in case the reaction has been conducted by gas phase polymerization should not contain more than 1,000 ppm of water.

As described above, the catalyst residue in the polymer can be reduced further by washing the slurry with water under acidic conditions subsequent to the treatment with a β-dicarboxy compound and alcohol and prior to the washing with a hydrocarbon solvent. No particular restrictions are imposed on the acidity so far as the aluminum salt is soluble, and hence the acidity is generally 6 or less, preferably 4 or less, in terms of pH. Here, the washing means washing of the slurry and can be effected by fully agitating and mixing the slurry and the water to transfer the water-soluble components in the slurry to the water phase, allowing the resulting mixture to stand for a phase separation, and throwing away the water phase thus separated; or by bringing the water and the slurry into countercurrent contact with each other by means of a countercurrent washing column. The temperature of the washing, the ratio of the polymer to the water used in the slurry, the number of washing times, etc. are the same as those in the washing of the polymer with a hydrocarbon solvent.

The second process for removing the catalyst residue comprises treating a syndiotactic polypropylene with an alcohol containing hydrochloric acid gas under non-aqueous conditions and then washing the resulting polypropylene with a hydrocarbon solvent, or treating a syndiotactic polypropylene with an alcohol containing hydrochloric acid gas, washing the resulting polypropylene with water under acidic conditions and then washing it with a hydrocarbon solvent. The hydrochloric acid gas used herein should be substantially anhydrous. The anhydrous hydrochloric acid gas is available in the market and, depending on situations, it can be readily synthesized by reacting conc. sulfuric acid with sodium chloride. The acid gas containing not more than 1%, preferably not more than 0.1%, of water is employed. The gas is used in the state of saturation in the alcohol, and in an amount of generally not less than 0.1 mole, preferably 1–10,000 moles, per mole of the aluminoxane. The amount less than this will produce little effects, whereas that used in excess of this may not necessarily be more effective. Further, as the alcohol, the above-described alcohols can be used. The treating applied herein also signifies mixing the polymer and the treating agent for from seconds to hours by a mechanical means such as agitation, and is carried out by adding the alcohol containing hydrochloric acid gas to the polymer in a slurry state in the same manner as described in the first process, depending on the kind of the polymerization reaction. The amount of the alcohol used is 1.0–1,000,000 moles, commonly 10–100,000 moles, per mole of the aluminoxane. The treating temperature is the same as that employed in the first process. Since the aluminoxane is rendered soluble in the hydrocarbon solvent by this treatment, sufficient removal of the catalyst residue can be attained by washing the slurry with the hydrocarbon solvent. The treatment is conducted also under non-aqueous conditions, so that the alcohol to be added for the treatment and the inert medium or liquid propylene to be added in case the reaction has been conducted by gas phase polymerization should generally be those containing not more than 1,000 ppm of water.

Also in the second process, further reduction of the catalyst residue in the polymer can be accomplished by washing the slurry with water under acidic conditions subsequent to the treatment with an alcohol containing hydrochloric acid gas and prior to the washing with a hydrocarbon solvent. In this case, the acidity of the water, washing procedure and washing conditions are the same as those in the first process. By putting the processes of the present invention into practice, syndiotactic polypropylenes, whose moldings are not sticky and which are purified and excellent in properties, can be obtained. Thus, the processes of the present invention are highly valuable from industrial points of view.

The processes for preparing the homopolymers of propylene have been described above. The processes of the present invention can also be applied to the process for preparing syndiotactic polyolefins from a single $\alpha$-olefin having 3 to 12 carbon atoms, from a mixture thereof, or from a mixture thereof with ethylene.

The present invention will be described more specifically with reference to the following examples.

EXAMPLE 1

In 1 liter of toluene in an autoclave with an inner volume of 2 liters were dissolved 10 mg of isopropyl-(cyclopentadienyl-1-fluorenyl)zirconium dichloride and 1.34 g of methylaluminoxane having a polymerization degree of about 15. Here, the isopropyl(cyclopentadienyl-1-fluorenyl)zirconium dichloride had been obtained by introducing lithium into isopropylcyclopentadienyl-1-fluorene synthesized in an ordinary manner and then reacting the resulting compound with zirconium tetrachloride, while the methylaluminoxane had been obtained by reacting copper sulfate hexahydrate with trimethylaluminum toluene. While charging propylene into the autoclave so as to constantly maintain the polymerization pressure at 2 kg/cm$^2$G, the propylene was reacted at 50° C. for 1 hour. Following the purge of the unreacted monomer, the autoclave was opened and the contents were filtered at 30° C. under suction using an apparatus consisting of a Nutsche (Büchner funnel) and a filtration flask. Then, 500 ml of toluene was added onto the powdery polymer on the Nutsche, followed by filtration under suction. This operation was repeated 5 times at 25° C. After the washing operations, the polymer was dried at 80° C. under reduced pressure to obtain 28 g of a powdery polymer. Its syndiotactic pentad fraction was 0.902 according to $^{13}$C-NMR, while the intrinsic viscosity (hereinafter referred to as "$\eta$") measured in a tetralin solution at 135° C. was 0.88. The portion soluble in toluene weighed 19 g. The powder was molded at 250° C. to form a 1 mm sheet, and its properties were measured as follows:

| | |
|---|---|
| Tensile yield strength: kg/cm$^2$ | ASTM D638 (23° C.) |
| Elongation: % | ASTM D638 (23° C.) |
| Izod impact strength: kg · cm/cm (notched) | ASTM D256 (23° C., −10° C.) |

The tensile yield strength was 204 kg/cm$^2$, the elongation was 740%, and the values of the Izod impact strength were 14.1 and 2.1 kg·cm/cm (at 23° C. and −10° C., respectively). The sheet was not sticky at all, but was slightly colored.

COMPARATIVE EXAMPLE 1

Polymerization reaction was conducted in quite the same manner as in Example 1, and the unreacted propylene was then purged. The remaining contents were added with 3 liters of methanol and filtered. The powder thus obtained was washed 5 times with 500 ml of methanol. Then, the powder was dried at 80° C. under reduced pressure. The resulting powder weighed 46 g and had a syndiotactic pentad fraction of 0.752 according to $^{13}$C-NMR and an of 0.68. The powder was molded into a sheet in the same manner as in Example 1 and its properties were measured. As a result, its tensile yield strength was 105 kg/cm$^2$ the elongation was 820%, and the values of the Izod impact strength were 25.1 and 3.8 kg·cm/cm (at 23° C. and −10° C., respectively). The surface of the moldings was sticky.

EXAMPLE 2

In an autoclave having an inner volume of 5 liters was charged 1,500 g of propylene, to which 10 mg of isopropyl-(cyclopentadienyl-1-fluorenyl)zirconium dichloride and 1.34 g of methylaluminoxane having a polymerization degree of about 15 were added at 30° C. under pressure. The contents were agitated at 30° C. for 1 hour to carry out the reaction. Following the purge of the unreacted propylene, the autoclave was opened to obtain a powdery polymer, which was then dried at 80° C. under reduced pressure, thereby obtaining 68 g of a syndiotactic polypropylene. The polypropylene was dispersed in 500 ml of hexane and filtered at 30° C. under suction using a Nutsche and a filtration flask. Then, 500 ml of hexane was added onto the powdery polymer on the Nutsche, followed by filtration under suction. This operation was repeated 3 times at 25° C. After the washing operations, the polymer was dried at 80° C. under reduced pressure to obtain 49 g of a polymer. In the same manner as in Example 1, the properties of the polymer and its molded sheet were measured. The measurement revealed that the syndiotactic pentad fraction was 0.853 according to $^{13}$C-NMR, the $\eta$ was 1 26, the tensile yield strength was 223 kg/cm$^2$ the elongation was 785 %, and the values of the Izod impact strength were 18.5 and 2.7 kg cm/cm (at 23°C. and −10° C., respectively). The molded product was not sticky.

COMPARATIVE EXAMPLE 2

Reaction, post-treatment and molding were carried out in quite the same manner as in Example 2, except that the washing with hexane was omitted. The measurement of the properties of the resulting polymer and sheet revealed that the $\eta$ was 1.06, the tensile yield strength was 88 kg/cm$^2$, the elongation was 830% and the values of the Izod impact strength were 28.5 and 4.1 kg·cm/cm (at 23° C. and −10° C., respectively). The molded product was sticky.

EXAMPLE 3

Reaction, post-treatment and molding were carried out in the same manner as in Example 2, except for discharging the unreacted propylene by siphon after completion of the bulk polymerization reaction, and further for charging additionally 1.5 kg of propylene followed by agitation at 25° C. and discharging the propylene likewise by a siphon pipe for washing. Thus, the properties of the resulting polymer and sheet were measured. The polymer or sheet had a syndiotactic pentad fraction of 0,809 according to $^{13}$C-NMR, an $\eta$ of 1.19, a tensile yield strength of 214 kg/cm$^2$, an elongation of 798% and values of the Izod impact strength of 26.5 and 4.0 kg cm/cm (at 23° C. and $-10°$ C., respectively). The molded product had no stickiness.

EXAMPLE 4

Following the polymerization in the same manner as in Example 1, the unreacted propylene was purged and the slurry-like contents were treated at 90°C. for 1 hour by adding thereto 250 ml of methanol and 2 ml of methyl acetoacetate in a stream of nitrogen. The resulting slurry was transferred to a 4-liter separable flask, to which was added 1 liter of water having 50 ml of 30% hydrochloric acid dissolved. The contents were agitated fully, allowed to stand and separated into layers, the water layer being then discarded. This slurry washing was repeated twice at 25° C. Then, similar washing was carried out once with 1 liter of water. Then, 3 liters of methanol was added to the remaining slurry-like toluene layer to cause the dissolved polymer to deposit. The resulting slurry was filtered at 25° C. under suction using a Nutsche and a filtration flask. Then, 300 ml of n-hexane was added onto the powdery polymer on the Nutsche, followed by filtration under suction. This operation was repeated 5 times at 25° C. After the washing operations, the polymer was dried at 80° C. under reduced pressure. The powder thus obtained weighed 36 g and had a syndiotactic pentad fraction of 0.885 according to $^{13}$C-NMR and an $\eta$ of 1.23. Its ash content was 48 ppm.

When the powder was molded at 250° C. to form a 1 mm sheet, the resulting sheet was fairly transparent, white and non-sticky. It had a tensile yield strength of 200 kg/cm$^2$, an elongation of 685% and values of the Izod impact strength of 10.2 and 2.1 kg cm/cm (at 23° C. and $-10°$ C., respectively). Then, another polymer powder was obtained in quite the same manner as described above, except that the slurry-like contents were treated only with 250 ml of methanol in place of with 250 ml of methanol and 2 ml of methyl acetoacetate in the aforesaid post-treatment after the reaction. The ash content of the powder was 285 ppm. Further, the sheet molded from the powder was colored light yellow-green.

EXAMPLE 5

The procedures of reaction, post-treatment and molding in Example 4 were followed except for using ethyl acetoacetate instead of methyl acetoacetate. The resulting powder had an ash content of 85 ppm and its molded product was highly transparent and white.

EXAMPLE 6

In 1 liter of toluene in an autoclave, having an inner volume of 2 liters were dissolved 5 mg of a purified product, obtained by recrystallizing the isopropyl(cyclopentadienyl-1fluorenyl)zirconium dichloride used in Example 1, and 0.68 g of methylaluminoxane having a mean polymerization degree of 16, manufactured by TOYO AKUZO Corp. While charging propylene into the autoclave so as to constantly maintain the polymerization pressure at 2 kg/cm$^2$G, the propylene was reacted at 25° C. for 1 hour. Following the purge of the unreacted propylene, the autoclave was opened and the slurry-like contents were treated at 60° C. for 1 hour by adding thereto 250 ml of methanol and 0.4 g of hydrochloric acid gas in a stream of nitrogen. The resulting slurry was transferred to a 4-liter separable flask, to which was added 1 liter of water having 50 ml of 30% hydrochloric acid dissolved. The contents were agitated fully, allowed to stand and separated into layers, the water layer being then discarded. This slurry washing was repeated twice at 25° C. Then, similar washing was carried out once with 1 liter of water. The resultant slurry was filtered to obtain a polymer. This polymer was dried at 80° C. under reduced pressure, thereby obtaining 89 g of a powdery polymer. Its syndiotactic pentad fraction was 0.935 according to $^{13}$C-NMR the $\eta$ being 1 42 and the ash content was 30 ppm. When the powder was molded at 250° C. to form a 1 mm sheet, the resulting sheet was fairly transparent, white and non-sticky. It had a tensile yield strength of 240 kg/cm$^2$, an elongation of 680% and values of the Izod impact strength of 14.8 and 2.6 kg·cm/cm (at 23° C. and $-10°$ C., respectively). Then, another polymer powder was obtained in quite the same manner as described above, except that the slurry-like contents were treated only with 250 ml of methanol instead of with 250 ml of methanol and 0.4 g of hydrochloric acid gas in the aforesaid post-treatment after the reaction. Its ash content was 205 ppm. Further, the sheet molded from the powder was colored light yellow-green.

EXAMPLE 7

On the post-treatment of the polymer after the polymerization in Example 6, the slurry washing with 1 liter of water having 50 ml of 30% hydrochloric acid dissolved and the following slurry washing operations were omitted, and hence the slurry having undergone the treatment with methanol containing hydrochloric acid gas was directly filtered. Onto the resulting polymer powder was added 2 liters of toluene, followed by filtration. This washing operation was repeated at 25° C. three times. The powder thus obtained had a syndiotactic pentad fraction of 0.935 according to $^{13}$C-NMR, an $\eta$ of 1.42 and an ash content of 40 ppm. The sheet molded from the powder was white and non-sticky.

EXAMPLE 8

Reaction and post-treatment were carried out in quite the same manner as in Example 7 except for using 4 ml of methyl acetoacetate in place of 0.4 g of hydrochloric acid gas. The powder thus obtained had a syndiotactic pentad fraction of 0.931 according to $^{13}$C-NMR, an $\eta$ of 1.42, and an ash content of 65 ppm. The sheet molded from the powder was white and non-sticky.

We claim:

1. A process for preparing a syndiotactic polypropylene comprising washing, at a temperature of from about 0° C. to about 100° C., with a hydrocarbon solvent of propylene, propane, butane, pentane, hexane, heptane, octane, nonane, benzene, toluene, xylene, ethylbenzene, or said hydrocarbons in which at least one of the hydrogen atoms thereof is substituted with halogen, a polymer obtained by polymerizing propylene in the presence of a catalyst comprising a transition metal compound having an asymmetric ligand, wherein the syndiotactic polypropylene of said polymer is insoluble in said hydrocarbon solvent and the non-syndiotactic polypropylene of said polymer is soluble in said hydrocarbon solvent and wherein said washing further comprises separating the solvent insoluble polymer from the solvent soluble polymer, so as to remove a surface polymer of low-tacticity or low-molecular weight from said syndiotactic polypropylene.

2. The process according to claim 1 wherein said catalyst comprises said transition metal compound and an aluminoxane.

3. The process according to claim 1 wherein prior to the washing with a hydrocarbon solvent, the polymer is treated with a β-dicarboxy compound represented by the general formula

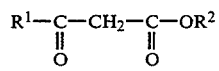

wherein $R^1$ and $R^2$ are individually a hydrocarbon residue having 1–12 carbon atoms and an alcohol under non-aqueous conditions.

4. The process according to claim 1 wherein prior to the washing with a hydrocarbon solvent, the polymer is treated with an alcohol containing hydrochloric acid gas under non-aqueous conditions.

5. The process according to claim 3 wherein subsequent to the treatment with a β-dicarboxy compound and an alcohol and prior to the washing with a hydrocarbon solvent, the polymer is washed with water under acidic conditions.

6. The process according to claim 4 wherein subsequent to the treatment with an alcohol containing hydrochloric acid gas and prior to the washing with a hydrocarbon solvent, the polymer is washed with water under acidic conditions.

7. The process according to claim 1, wherein said hydrocarbon solvent is toluene, 1, 2-dichloroethane, hexane or propylene.

* * * * *